(12) United States Patent
English

(10) Patent No.: US 8,285,747 B1
(45) Date of Patent: Oct. 9, 2012

(54) INCORPORATION OF CLIENT STORAGE INTO A STORAGE SYSTEM

(75) Inventor: Robert M. English, Menlo Park, CA (US)

(73) Assignee: NetApp, Inc., Sunnyvale, CA (US)

(*) Notice: Subject to any disclaimer, the term of this patent is extended or adjusted under 35 U.S.C. 154(b) by 764 days.

(21) Appl. No.: 11/717,895

(22) Filed: Mar. 13, 2007

Related U.S. Application Data

(60) Provisional application No. 60/782,674, filed on Mar. 14, 2006.

(51) Int. Cl.
*G06F 17/30* (2006.01)

(52) U.S. Cl. .................................................. 707/782

(58) Field of Classification Search ................. None
See application file for complete search history.

(56) References Cited

U.S. PATENT DOCUMENTS

| | | | | |
|---|---|---|---|---|
| 5,566,331 A * | 10/1996 | Irwin et al. | .................. | 707/10 |
| 5,644,766 A * | 7/1997 | Coy et al. | .................. | 395/620 |
| 5,644,789 A * | 7/1997 | Matthews et al. | .............. | 710/36 |
| 5,692,178 A * | 11/1997 | Shaughnessy | ................. | 395/608 |
| 5,991,809 A * | 11/1999 | Kriegsman | .................. | 709/226 |
| 6,249,801 B1 * | 6/2001 | Zisapel et al. | ................. | 718/105 |
| 6,336,187 B1 * | 1/2002 | Kern et al. | .................. | 713/161 |
| 6,505,217 B1 * | 1/2003 | Venkatraman et al. | .................. | 707/999.205 |
| 6,529,996 B1 * | 3/2003 | Nguyen et al. | ................. | 711/114 |
| 6,574,716 B2 * | 6/2003 | Dovi | .................. | 711/147 |
| 6,820,122 B1 * | 11/2004 | Mandler et al. | ............... | 709/226 |
| 6,854,034 B1 * | 2/2005 | Kitamura et al. | ............. | 711/112 |
| 6,883,081 B2 * | 4/2005 | Lanzatella et al. | ............ | 711/202 |
| 7,028,041 B2 * | 4/2006 | L'Heureux | .................. | 707/781 |
| 7,073,017 B2 * | 7/2006 | Yamamoto | .................. | 711/103 |
| 7,076,509 B1 * | 7/2006 | Chen et al. | .................. | 707/202 |
| 7,092,977 B2 * | 8/2006 | Leung et al. | ............. | 707/999.205 |
| 7,240,081 B1 * | 7/2007 | Okayasu et al. | ........ | 707/999.101 |
| 7,469,315 B2 * | 12/2008 | Watanabe et al. | ............ | 711/114 |
| 7,516,348 B1 * | 4/2009 | Ofer | .................. | 713/324 |
| 7,539,766 B1 * | 5/2009 | Strong et al. | ................. | 709/230 |
| 2002/0035667 A1 * | 3/2002 | Bruning et al. | ............... | 711/114 |
| 2002/0129049 A1 * | 9/2002 | Collins et al. | ................. | 707/500 |
| 2002/0129216 A1 * | 9/2002 | Collins | .................. | 711/170 |
| 2004/0107236 A1 * | 6/2004 | Nakagawa et al. | ........... | 709/200 |
| 2004/0199521 A1 * | 10/2004 | Anglin et al. | .................. | 707/100 |
| 2006/0107096 A1 * | 5/2006 | Findleton et al. | ................. | 714/6 |
| 2006/0112247 A1 * | 5/2006 | Ramany et al. | ............... | 711/165 |
| 2006/0206675 A1 * | 9/2006 | Sato et al. | ..................... | 711/161 |

OTHER PUBLICATIONS

Menon et al., IBM Storage Tank: A heterogenous scalable San file system, Nov. 2, 2003, IBM Syatem Journal, vol. 42, pp. 250-267.*

* cited by examiner

*Primary Examiner* — Neveen Abel Jalil
*Assistant Examiner* — Jacques Veillard
(74) *Attorney, Agent, or Firm* — Perkins Coie LLP

(57) ABSTRACT

Embodiments of the present invention are directed to an apparatus and methods for operating a storage system. The storage system incorporates a storage device associated with a client into a logical group of storage devices managed by the storage system. Thereafter, the storage system is capable of satisfying data access requests from an incorporated storage device managed by the storage system.

25 Claims, 7 Drawing Sheets

INCORPORATION OF CLIENT STORAGE INTO A STORAGE SYSTEM

CROSS REFERENCE TO RELATED APPLICATIONS

This application claims priority to Provisional Application 60/782,674 filed Mar. 14, 2006.

FIELD

Embodiments of the invention relate to storage systems and, more particularly, to incorporating client storage devices for management by a storage system.

BACKGROUND

A storage system typically comprises one or more storage devices into which data may be entered, and from which data may be obtained, as desired. The storage system may be implemented in accordance with a variety of storage architectures including, but not limited to, a network-attached storage environment (NAS), a storage area network (SAN) and a disk assembly directly attached to a client or host computer. The storage devices are typically disk drives, wherein the term "disk" commonly describes a self-contained rotating magnetic media storage device. The term "disk" in this context is synonymous with hard disk drive (HDD) or direct access storage device (DASD). It should be appreciated that disk drives are examples of media accessible as storage. Other types of media, including optical media, solid state memory, and the like, are possible for storing data.

Client computers typically communicate with the storage system to either read data previously stored by the storage system or to write data. Written data is typically stored by the storage system to storage devices in the storage architectures described above. As demand for storage devices increase, because of ever increasing amounts of written data, typical solutions are to buy more storage devices. However, it is expensive to continue to buy storage devices. For example, costs include purchasing disks, and possibly, installation costs. Thus, it would be preferable to be able to supply storage devices for writing data while minimizing the cost to purchase and install the storage devices.

SUMMARY

In embodiments of the present invention, a storage system can utilize the storage devices of a client computer, by incorporating or integrating, client storage devices into a storage system and managing the client storage devices as part of the storage system. Specifically, by recognizing that each client computer includes one or more storage devices that may not be fully utilized by a client computer, embodiments of the present invention contemplate using the underutilized storage devices of client computers as storage devices of the storage system.

In one embodiment of the present invention for operating a storage system, the storage system incorporates a storage device associated with a client into a logical group of storage devices managed by the storage system. Thereafter, the storage system is capable of satisfying data access requests from an incorporated storage device managed by the storage system.

BRIEF DESCRIPTION OF THE DRAWINGS

The following description includes discussion of various figures having illustrations given by way of example of implementations of embodiments of the invention. The drawings should be understood by way of example, and not by way of limitation.

DETAILED DESCRIPTION

Figure 1:
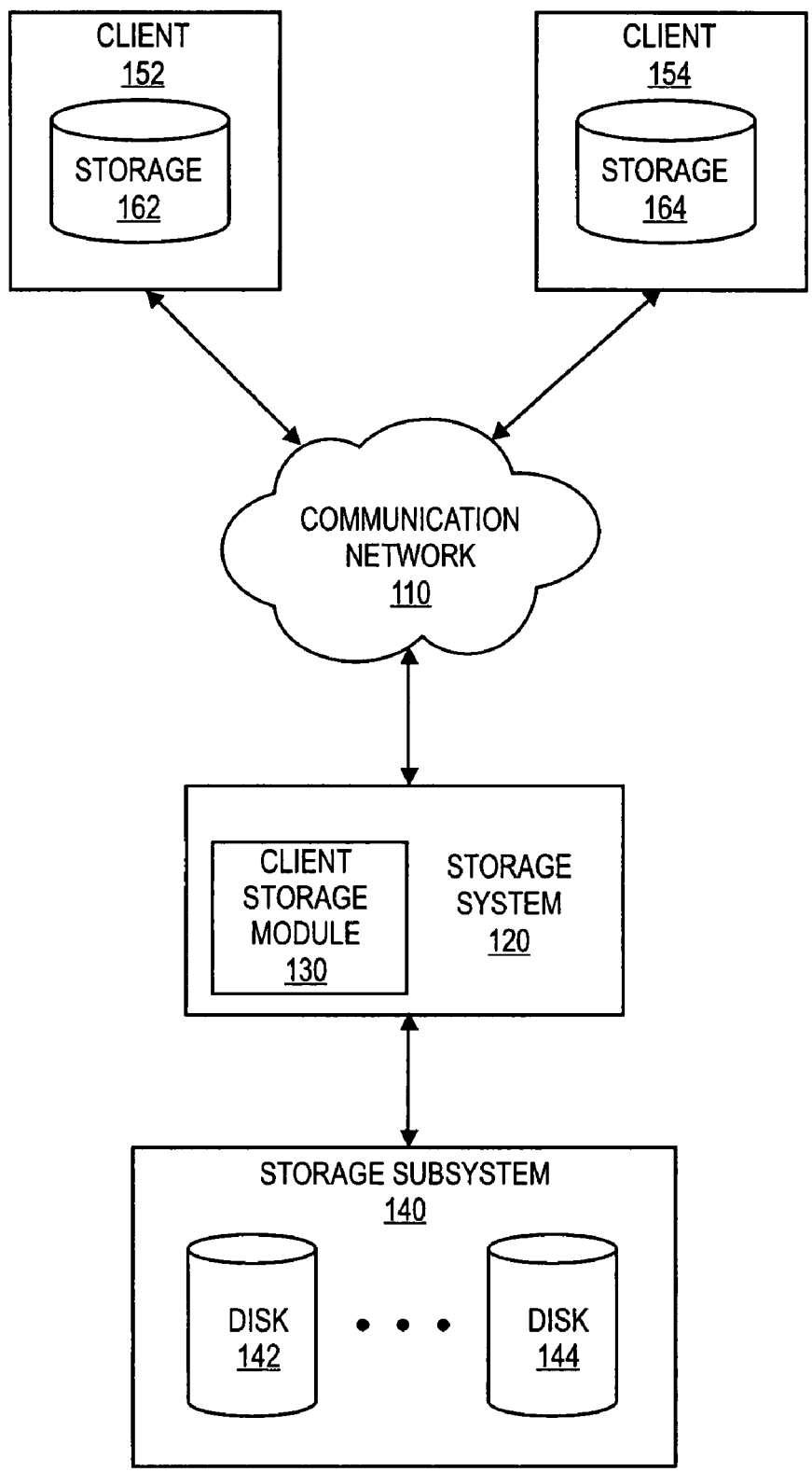
FIG. 1 is a block diagram of an embodiment of a storage system including a client storage module.

In embodiments of the present invention, a storage system can utilize the storage devices of a client computer (hereinafter client), by incorporating or integrating, client storage devices into a storage system and managing the client storage devices as part of the storage system. Specifically, by recognizing that each client computer includes one or more storage devices that may not be fully utilized by a client computer, embodiments of the present invention contemplate using the underutilized storage devices of client computers as storage devices of the storage system.

Further, the client need not implement specialized client software to permit the management of the underutilized storage devices of the client by the storage system. Specifically, file system semantics, reliability, and other file system management services can be provided by the storage system to manage the client storage devices, rather than the client providing these services. Moreover, incorporation of the client storage devices can occur with any client in communication with the storage system in a network (e.g., a server farm, a Linux farm/cluster, a client farm, a blade farm operating to host virtualized storage systems by using virtualization software such as Xen, and multiple modules). Further, a RAID-based, or similar storage paradigm, can allow a storage system to operate on client storage devices.

Generally, the storage system virtualizes the client storage devices by incorporating the client storage devices into logical groups of storage devices managed by the storage system. Client computers can initiate access requests to the storage system to perform a disk read request (or simply a "read"), or a disk write request (or simply "write"). Upon receiving the read or write request, the storage system services, or satisfies, the request by processing the access request transparently. Illustratively, it is transparent to the client computer initiating the access request, e.g. a read operation, whether the data is provided from a client storage device or a storage device that is typically a member of a storage subsystem. Further, data can be written to client storage devices or to storage devices of a storage subsystem, without revealing the location of the storage device having the written data to the client computer requesting the write operation. Examples follow in relation to FIG. 1 through FIG. 6.

As used herein, references to one or more "embodiments" are understood as describing a particular feature, structure, or characteristic included in at least one implementation of the invention. Thus, the appearance of phrases such as "in one embodiment," or "in an alternate embodiment," do not necessarily all refer to the same embodiment. However, they are also not necessarily mutually exclusive. Descriptions of certain details and implementations follow, including a description of the figures, which may depict some or all of the embodiments described below, as well as discussing other potential embodiments or implementations of the inventive concepts presented herein.

FIG. 1 is a block diagram of an embodiment of a storage system 120 including a client storage module 130. The storage system, or simply, system 120, includes clients 152-154, which represent computing devices coupled to communication network 110. Communication network 110, or simply, network 110, may be, for example, a local area network (LAN), wide area network (WAN), metropolitan area network (MAN), global area network (GAN) such as the Internet, or any combination thereof. Network 110 can include connection hardware (e.g., Category-5 or other twisted pair cable, coaxial cable, wireless communication transceivers), as well as flow direction hardware (e.g., interface circuits/cards, switches, routers, servers). Each client 152 and 154 may be a conventional desktop computer, a laptop computer, workstation, a network server, mobile device such as a cellular telephone or PDA (personal digital assistant), etc.

Clients 152-154 are shown having storage 162-164, respectively, which represent mass storage devices on the clients, such as, e.g. magnetic media embodied as disk drives. In one embodiment of the preset invention, storage 162-164 are incorporated into a storage system 120 and are managed by storage system 120. The data and/or free space on storage 162-164 can be made available for storage services similar to those provided by storage subsystem 140.

Clients 152 and 154 generate requests for access to data stored on storage subsystem 140 and/or data on other clients (i.e., client 152-154 or other clients not shown in FIG. 1). Storage system 120 services the requested access functions to clients 152-154, depending on what request is made, what permissions a client has, etc.

Storage system 120 includes client storage module 130, which enables storage system 120 to manage client storage 162-164. The storage system 120 may provide clients with file-level services, as with traditional file servers; alternately, or in addition, storage system 120 may provide clients with block-level access to stored data. Thus, as used herein, storage system 120 should be understood to be a storage system that provides file-based (e.g., NAS (network attached storage)) services, or alternatively, or in addition, a storage system that provides block-based (e.g., SAN (storage area network)) services. The data services, whether file-level or block-level, include providing access to storage subsystem 140, for either data storage and/or data retrieval. Additionally, as described herein, the data services may include access to data on storage 162-164. Data storage and retrieval are examples of disk I/O that may be performed with disks 142 and 144 and storage 162 and 164.

Storage system 120 may have a distributed architecture. Thus, in one embodiment, storage system 120 may include a separate N- ("network") module and a D- (disk) module (neither shown in FIG. 1) embodied in integrated hardware or separate hardware components. Specifically, the N-module couples storage system 120 to communication network 110 to communicate with clients 152-154. Further, the D-module includes file system/storage management functionality and couples storage system 120 to storage subsystem 140 to communicate with the corresponding storage resources. As for access to storage 162-164, either the N-module could be modified to include data access services with respect to storage available on the clients, and/or the D-module is modified to include network services to access the storage available on the clients. The N-module and D-module communicate with each other using an internal protocol. Alternatively, storage system 120 may have an integrated architecture, where the network and data components are contained within a single box and/or single circuit component/manufacture. Storage system 120 further may be coupled through a switching fabric to other similar filers/file servers (not shown), each having its own local storage subsystem. In this way, one or more storage subsystems can form a single storage pool, to which a client may be provided access.

Figure 2:
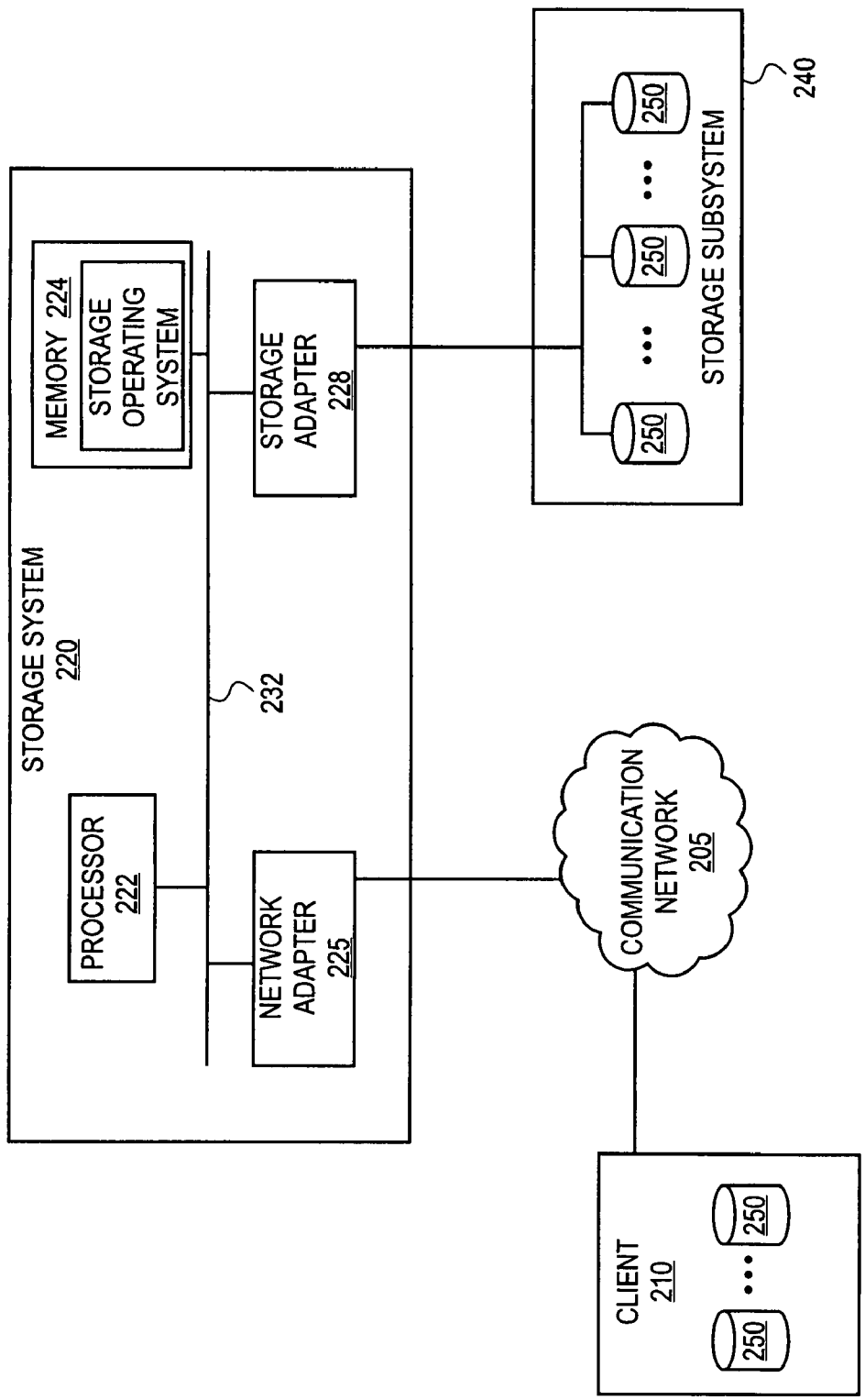
FIG. 2 is a block diagram of an embodiment of a storage system coupled to a storage subsystem and a client.

FIG. 2 is a block diagram of an embodiment of a storage system coupled to a storage subsystem and a client that may be advantageously used with the present invention. The inventive technique described herein may apply to any type of special-purpose (e.g., file server or filer) or general-purpose computer, including a standalone computer or portion thereof, embodied as or including a storage system 220. In the illustrative embodiment, the storage system 220 comprises a processor 222, a memory 224, a network adapter 225 and a storage adapter 228 interconnected by a system bus 232. The memory 224 comprises storage locations that are addressable by the processor and adapters for storing software program code and data structures associated with the present invention. The processor and adapters may, in turn, comprise processing elements and/or logic circuitry configured to execute the software code and manipulate the data structures. A storage operating system operating in the memory 224, portions of which are resident in memory and executed by the processing elements, functionally organizes the system 220 by, inter alia, invoking storage operations executed by the storage system. It will be apparent to those skilled in the art that other processing and memory means, including various computer readable media, may be used for storing and executing program instructions pertaining to the inventive technique described herein.

The network adapter 225 comprises a plurality of ports adapted to couple the storage system 220 to one or more clients 210 over point-to-point links, wide area networks, virtual private networks implemented over a public network (Internet) or a shared local area network. The network adapter 225 thus may comprise the mechanical, electrical and signaling circuitry needed to connect the node to the network. Illustratively, the network 205 may be embodied as an Ethernet network, a Fibre Channel (FC) network, or the like. Each client 210, including one or more disks 250, may communicate with the storage system 220 over network 205 by exchanging discrete frames or packets of data according to pre-defined protocols, such as TCP/IP.

The storage adapter 228 cooperates with the storage operating system executing on the system 220 to access information requested by a user (or client). The information may be stored on any type of attached array of writeable storage device media such as video tape, optical, DVD, magnetic tape, bubble memory, electronic random access memory, micro-electro mechanical and any other similar media adapted to store information, including data and parity information. However, as illustratively described herein, the information is preferably stored on the disks 250, such as HDD and/or DASD, of storage subsystem 240. The storage adapter includes input/output (I/O) interface circuitry that couples to the disks over an I/O interconnect arrangement, such as a conventional high-performance, FC serial link topology.

Storage of information on storage subsystem 240 is preferably implemented as one or more storage "volumes" that comprise a cluster of physical storage disks 250, defining an overall logical arrangement of disk space. Each volume is generally, although not necessarily, associated with its own file system. The disks within a volume/file system are typically organized as one or more groups, wherein each group is operated as a Redundant Array of Independent (or Inexpensive) Disks (RAID). Most RAID implementations, such as RAID technologies employed by Network Appliance, Inc, or other storage system providers, enhance the reliability/integrity of data storage through the redundant writing of data "stripes" across a given number of physical disks in the RAID group, and the appropriate storing of parity information with respect to the striped data.

Further, it should be appreciated that client 210 or the storage system 220 should startup without waiting for the other to boot. For example, the storage system 220 can boot first, followed by the client 210 booting. Alternatively, both the client 210 and the storage system 220 can boot simultaneously. It is sufficient that neither the client 210 nor the storage system 220 waits for the other to startup. After both the client 210 and the storage system 220 are operating, then the storage system 220 can integrate into the storage system pool of storage devices any client storage devices that are underutilized by the client. Details relating to the integration of client storage devices follow hereinafter.

Figure 3:
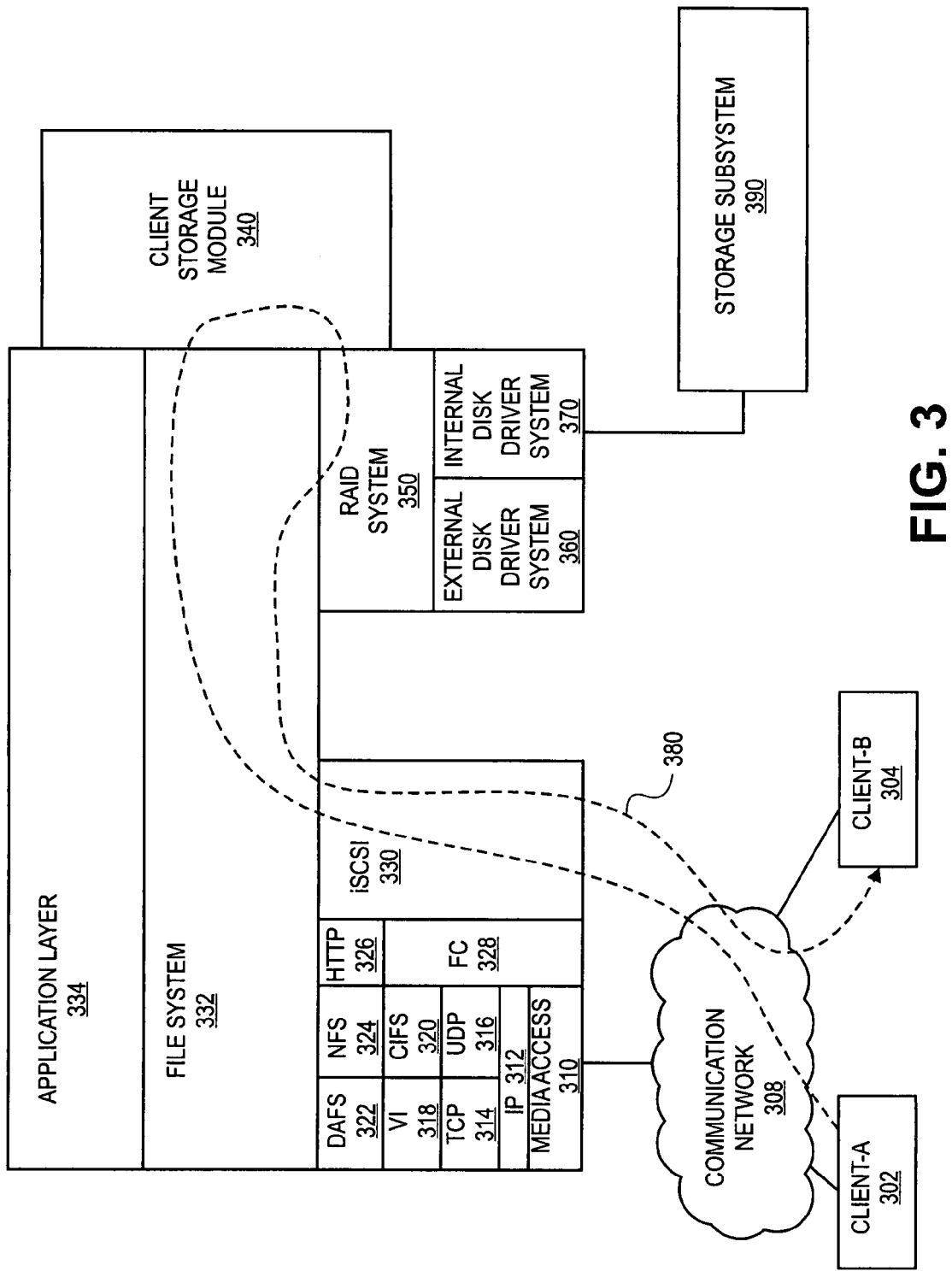
FIG. 3 is a block diagram of an embodiment of a storage system operating system interacting with clients and a storage subsystem.

FIG. 3 is a block diagram of an embodiment of a storage system operating system interacting with clients and a storage subsystem. For example, the operating system includes a multi-protocol engine that provides data paths for clients to access information stored by the storage system using block and file access protocols. The protocol stack includes a media access layer of network drivers (e.g. gigabit Ethernet drivers) that interfaces to network protocol layers, such as the IP layer 312 and its supporting transport mechanisms, the TCP layer 314 and a User Datagram Protocol (UDP) layer 316. A file system protocol layer provides multi-protocol file access and, to that end, include support for the Direct Access File System (DAFS) protocol 322, the NFS protocol 324, the CIFS protocol 320 and the Hypertext Transfer Protocol (HTTP) to 326. Further, a VI layer 318 implements the VI architecture to provide direct access transport (DAT) capabilities, such as RDMA, as required by the DAFS protocol 322.

The multi-protocol engine includes an iSCSI driver layer 330 that provides block protocol access over the TCP/IP network protocol layers, while a Fibre Channel (FC) driver layer 328 receives and transmits block access requests and responses to and from the storage system. The FC and iSCSI drivers provide FC-specific and iSCSI-specific access control to the blocks and, thus, manage exports of luns to either iSCSI or FC or, alternatively to both iSCSI and FC when accessing the blocks on the storage system. In addition, the operating system includes a storage module embodied as a RAID system 350 that manages the storage and retrieval of information to and from volumes/disks in accordance with I/O operations, an external disk driver system 360, and an internal disk driver system 370. For example, the external disk driver system 360 and the internal disk driver system 370 can implement a disk access protocol such as, e.g., the SCSI protocol. Accordingly, the storage subsystem 390, which includes storage media, is communicably coupled via the internal disk driver system 372 to the storage system operating system.

A file system 332 is illustratively a message-based system that provides logical volume management capabilities to access information stored by the storage system. Further, in one embodiment, the file system 332 may, for example, implement the Write Anywhere File Layout, (WAFL®) file system, available from Network Appliance, Inc. It should be appreciated that other file systems are possible in other embodiments of the present invention, such as write-in-place file systems, etc. The operating system also includes an application layer 334, which may include a user interface application (not shown) to enter data into the storage system. For example, the user interface application residing in the application layer 334 may include a command line interface (CLI), graphical user interface (GUI), or the like.

In the illustrative embodiment, the operating system is preferably the NetApp® Data ONTAP® operating system available from Network Appliances, Inc. However, it is expressly contemplated that any appropriate storage operating system may be enhanced for use in accordance with the inventive principles described herein. As such, where the term "Data ONTAP" is employed, it should be taken broadly to refer to any storage operating system that is otherwise adaptable to the teachings of this invention. In addition, software to implement the technique introduced herein may be stored on a computer-readable storage medium that provides information in a form readable by a computer, network device, PDA, manufacturing tool, or any device with a set of one or more processors.

The client storage module 340 of the operating system manages access to the storage available on the clients. For example, as illustrated in FIG. 3, client-A 302 and client-B 304 use the communication network 308 to communicate data access requests to the operating system via a path 380. Specifically, in one embodiment, client-A 302 can generate a read data operation to the operating system to request data. In an embodiment of the invention, upon receiving the data operation via the iSCSI driver layer 330, the file system 332 forwards the request to the client storage module 340. It should be appreciated that other protocols of the multi-protocol engine, as illustrated on FIG. 3 (e.g. FC and the like) are contemplated by embodiments of the present invention. The client storage module 340, which is described in further detail in relation to FIG. 4, determines the location of the client storage that may have data requested by client-A 302. Upon discovering the location of the data requested by client-A 302, which for purely illustrative purposes resides in storage of client-B 304, the client storage module 340 forwards the location information to the RAID system 350. Thereafter, the RAID system 350 transmits the request to perform a read data operation to the client-B 304 via the iSCSI driver layer 330 and communication network 308. The client-B 304 then performs the read operation and transmits the data to the storage system, and in particular, the operating system, to provide the data to client-A 302.

In an alternative embodiment, the external disk driver system 360 can communicate with clients via the communication network 308, and avoid following the path 380, as described above. For example, by communicating directly from the external disk driver system 360, the file system 332 and the iSCSI driver layer 330 need not transmit the read request to client-B 304. Instead, after the client storage module 340 determines the location of the appropriate client storage that contains the data, the client storage module 340 forwards the location information to the RAID system 350, which then transmits the request to perform the read data operation via the external disk driver system 360. Thus, the multi-protocol engine and file system 332 can process other data operation requests while the original data read operation is processed via the external disk driver system 360.

Figure 4:
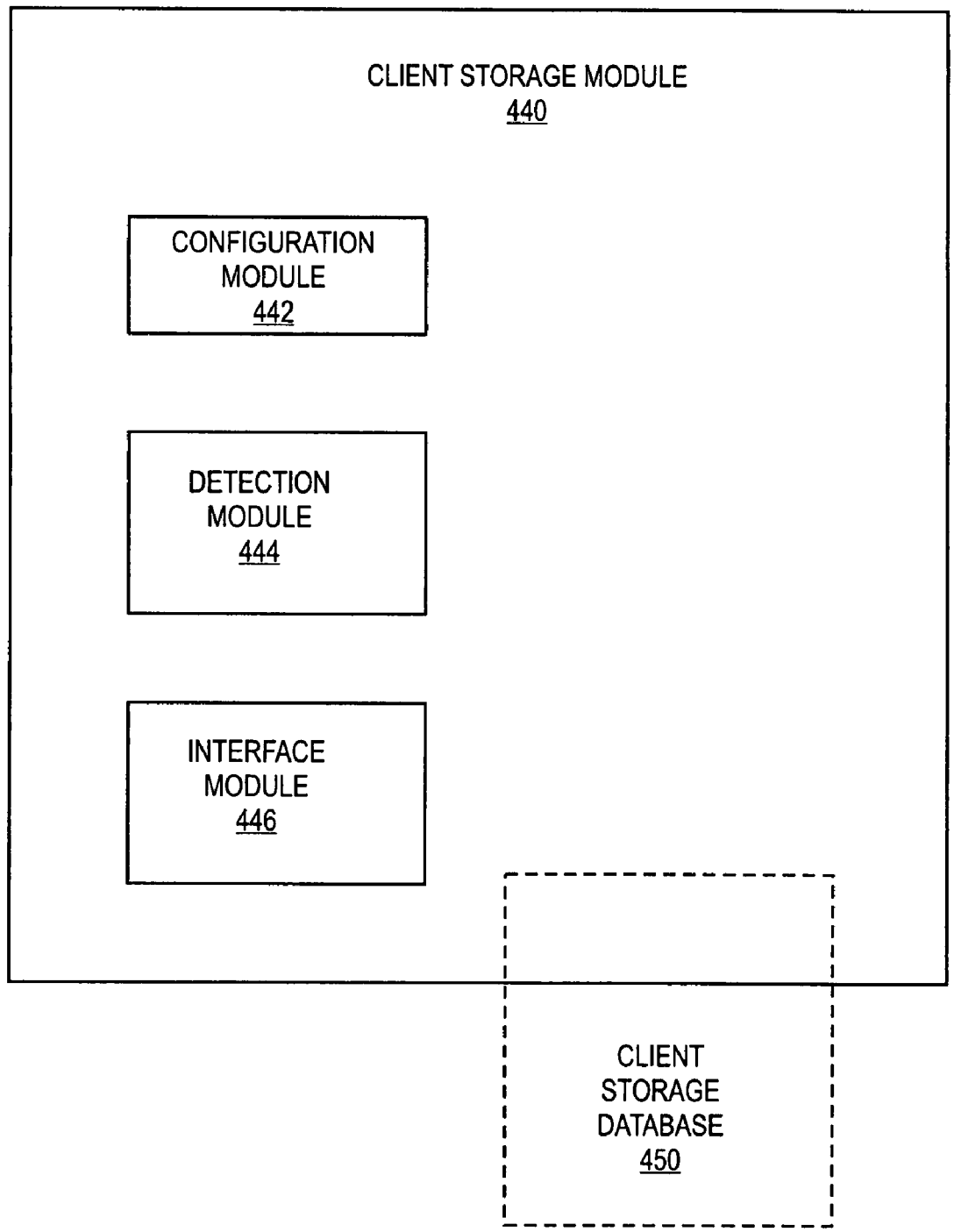
FIG. 4 is a block diagram of an embodiment of a client storage module.

FIG. 4 is a block diagram of an embodiment of a client storage module 440. The client storage module 440 manages client storage available for use by the storage system 220 (see FIG. 2). Specifically, the client storage module 440 includes a configuration module 442, a detection module 444, and an interface module 446. In an embodiment of the present invention, a management application, such as DataFabric® Manager (DFM), available from Network Appliance, Inc., can be adapted to identify clients with available storage for use by the storage system. For example, data entered into a management application, perhaps by an administrator, is received by the configuration module 442 to establish a list of clients with available storage. Data can include e.g. an IP address of a client and authentication information of a client. It should be appreciated that the authentication information prevents unauthorized addition of storage devices to the storage system 220 and may include signatures used in authentication algorithms, such as described in the OpenPGP standard (RFC 2240), and the like. In yet other embodiments, the data can be obtained by the management application by having components operating on the client and/or the storage system, either of which can query the client for the information. Accordingly, a list can be maintained by the management application for use by the storage system 220 to identify clients.

After formation of the list, the storage system 220, and in particular, the detection module 444 of the client storage module 440, can poll the clients to determine available client storage devices. For example, the detection module 440 can communicate with the management application to obtain the client identification information on the list. Thereafter, the storage system 220 can communicate with the client to identify client storage device identification information, e.g. employing exemplary storage device identification methods used by storage systems available from Network Appliance, Inc. After identifying the available storage devices for incorporation, the storage system 220 can export the storage devices (whether as physical storage devices or as virtual storage devices) to permit the reading and writing of data to the storage devices. It should be appreciated that exporting storage devices is known to those of ordinary skill in the art, such as using NFS and the like.

The list of clients can be stored on a client storage database 450, as illustrated in FIG. 4 by the configuration module 442. The client storage database 450 can be any type of structure, or repository, to store data, such as a relational database, tree structure, flat file, or the like. Further, the client storage database 450 can be stored persistently on the storage system, the storage subsystem 390 (see FIG. 3), or some other management system (not shown), in communication with the storage system (e.g. a storage device of the storage subsystem or the storage system NVRAM, flash memory, storage device or the like). It should be appreciated that the client storage database 450 need only maintain the list of clients with storage for use by the storage system. Such a list can be organized to include information such as the location of the client, e.g. IP address, client name, and disk capacity. In other embodiments, the information can include more or less data, as long as the data helps the storage system to identify the client storage.

The client storage module 440 also includes the detection module 444. In contrast with the configuration module 442, which establishes the list of clients for use by the storage system, the detection module 444 detects, or determines, whether a particular disk of client storage is ready for use. Specifically, in response to receiving a data operation such as a read or write, the detection module 444 examines the client storage database 450 to find the appropriate client storage to perform the data operation.

Another component of the client storage module 340 is an interface module 446. The interface module interacts with the RAID system 350 to communicate with a client, as depicted in FIG. 3. Specifically, the interface module 446 provides location information to the RAID system 350. The RAID system 350 then communicates with the client either using the multi-protocol engine or the external disk driver system 360.

Figure 5A:
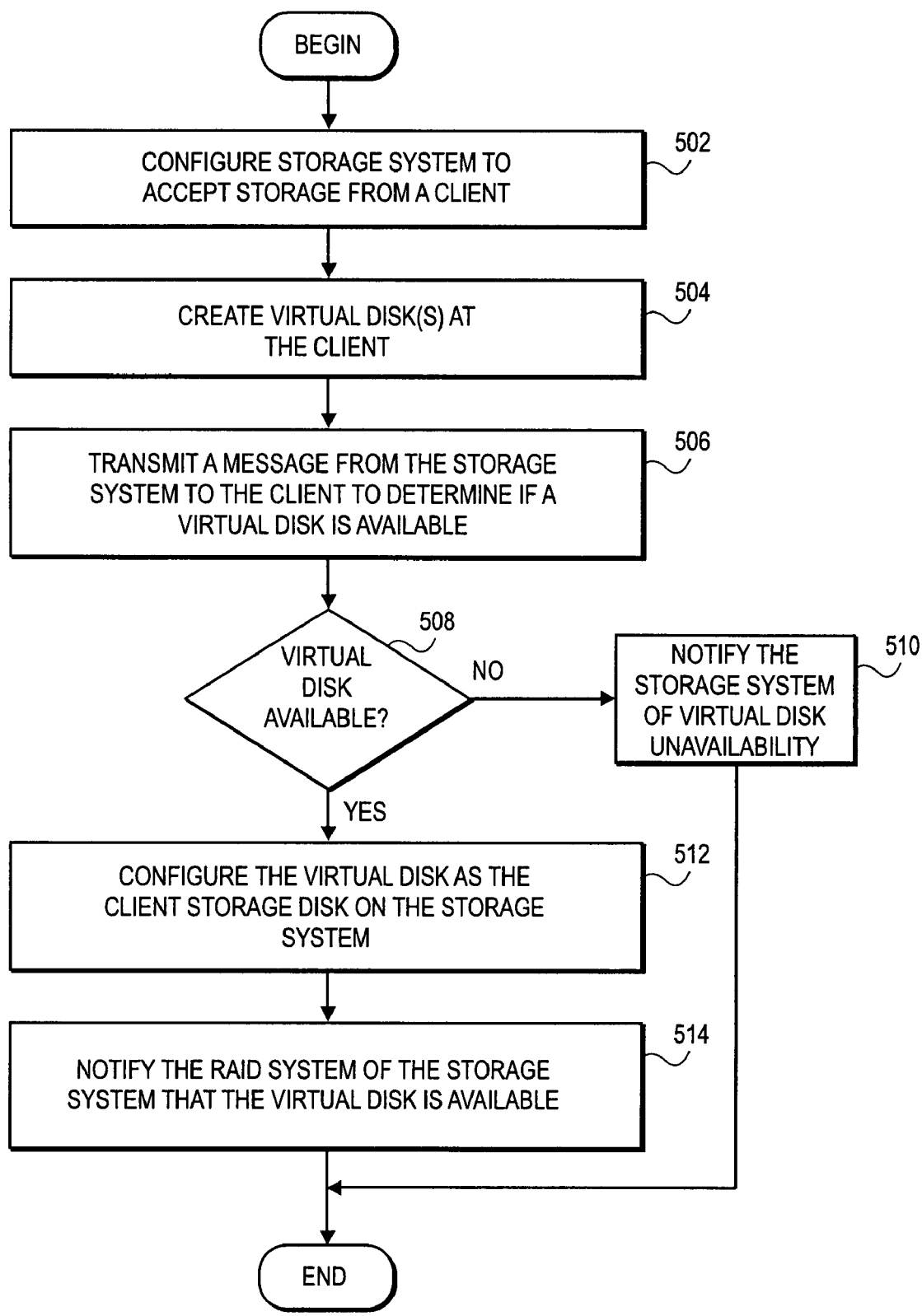
FIG. 5A is a flow diagram of an embodiment of a process for configuring client storage for incorporation.

FIG. 5A is a flow diagram of an embodiment of a process for configuring client storage for incorporation. Specifically, the client storage module 440, and in particular the configuration module 442, can implement the process for configuring client storage such that a storage system can identify the location of client storage. In operation 502, the process can configure the storage system to accept storage from a client. For example, an administrator can identify via a management application, available disks on a client for use. Alternatively, in another embodiment, the storage system can transmit a message to clients in communication with the storage system to request that any available disks be identified for use by the storage system.

Upon identifying available disks, in operation 504, the process continues by creating at least one virtual disk at the client. The creation of the virtual disk is known to those of ordinary skill in the art and will not be described in detail here. For example, the client operating system can create a virtual disk from available storage either from commands entered by an administrator via a management application or via messages from the storage system. In operation 506, the storage system transmits a message to the client to determine if a virtual disk is available. If a virtual disk is available, as illustrated in operation 508, then the client storage module of the storage system configures the virtual disk as a client storage disk in operation 512. The configuration information includes the location information of the virtual disk and in particular, the client. This location information is stored in the client storage database. Thereafter, in operation 514, the process notifies the RAID system of the storage system that the virtual disk is available. However, if in operation 508 there is no virtual disk available, then in operation 510 the client notifies the storage system of the unavailability of a virtual disk.

Figure 5B:
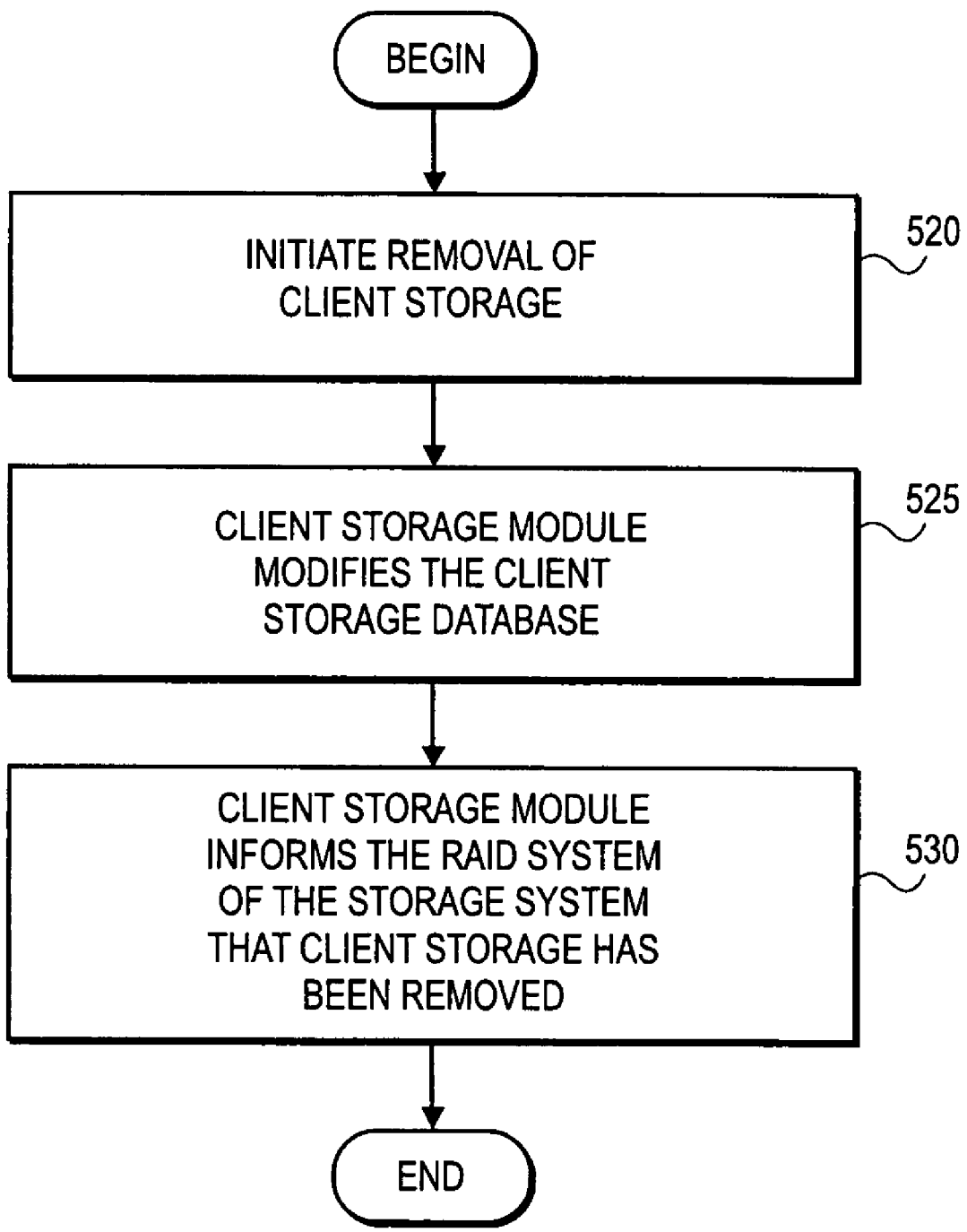
FIG. 5B is a block diagram of an embodiment of a process for removing client storage.

FIG. 5B is a block diagram of an embodiment of a process for removing client storage. In various embodiments of the present invention, client storage may be removed. Removal causes the client storage to no longer be in communication with the storage system, thus causing the client storage to no longer be able to respond to read and write requests. For example, a physical disk, such as the storage media described above, may be removed from the client. Alternatively, the client may shut down and no longer be in communication with the storage system. In yet another embodiment, a network connectivity issue may cause the storage system to no longer detect the client, effectively causing the client storage to be removed.

In an alternative embodiment, an administrator can initiate the removal process. Illustratively, an administrator, using a storage management application, e.g. (DFM offered by Network Appliance, Inc), can request the removal of client storage. The storage system determines whether the client storage may be safely removed by examining factors such as current data access to the client storage, the need of available space offered by the client storage (e.g. being able to provide adequate volume guarantees), and whether the removal of client storage will cause loss of data (e.g. the loss of RAID parity, thus ensuring data corruption by the removal of client storage being used as part of the RAID pool).

Thus, the client storage module can initiate the removal of client storage from the client storage database, as illustrated in operation 520. In operation 525, the client storage module modifies the client storage database. For example, the modification can be accomplished by marking an entry related to the location information of the client in the client storage database. Alternatively, the location information can be removed by deleting the entry in the client storage database. Thereafter, in operation 530, the client storage module informs the RAID system of the storage system that the client storage has been removed. This communication prevents the RAID system from erroneously communicating with the removed client storage.

After configuring client storage for use by the storage system, as described in relation to FIG. 5A, requests for data stored, or to be stored on the client storage can begin. It should be appreciated that a request for a data operation, such as a read or write command, can be initiated from any device in communication with the storage system. Such devices include, but are not limited to, client computers, backup devices, host computers, or the like.

In particular, incorporated client storage of the storage system can satisfy a request for a data operation by the implementation of the storage operating system. Specifically, the interaction of processes between the multi-protocol engine, the client storage module, RAID system, and the file system can satisfy requests. Details regarding the operation of the client storage module are described above and details regarding the satisfaction of the read and write commands are further described in U.S. patent application Ser. No. 10/836,817 titled, Extension of Write Anywhere File System Layout, filed on Apr. 30, 2004, which is hereby incorporated by reference in its entirety. However, it should be appreciated that other types of file systems, such as write-in-place, are possible for satisfying read and write commands.

Figure 6:
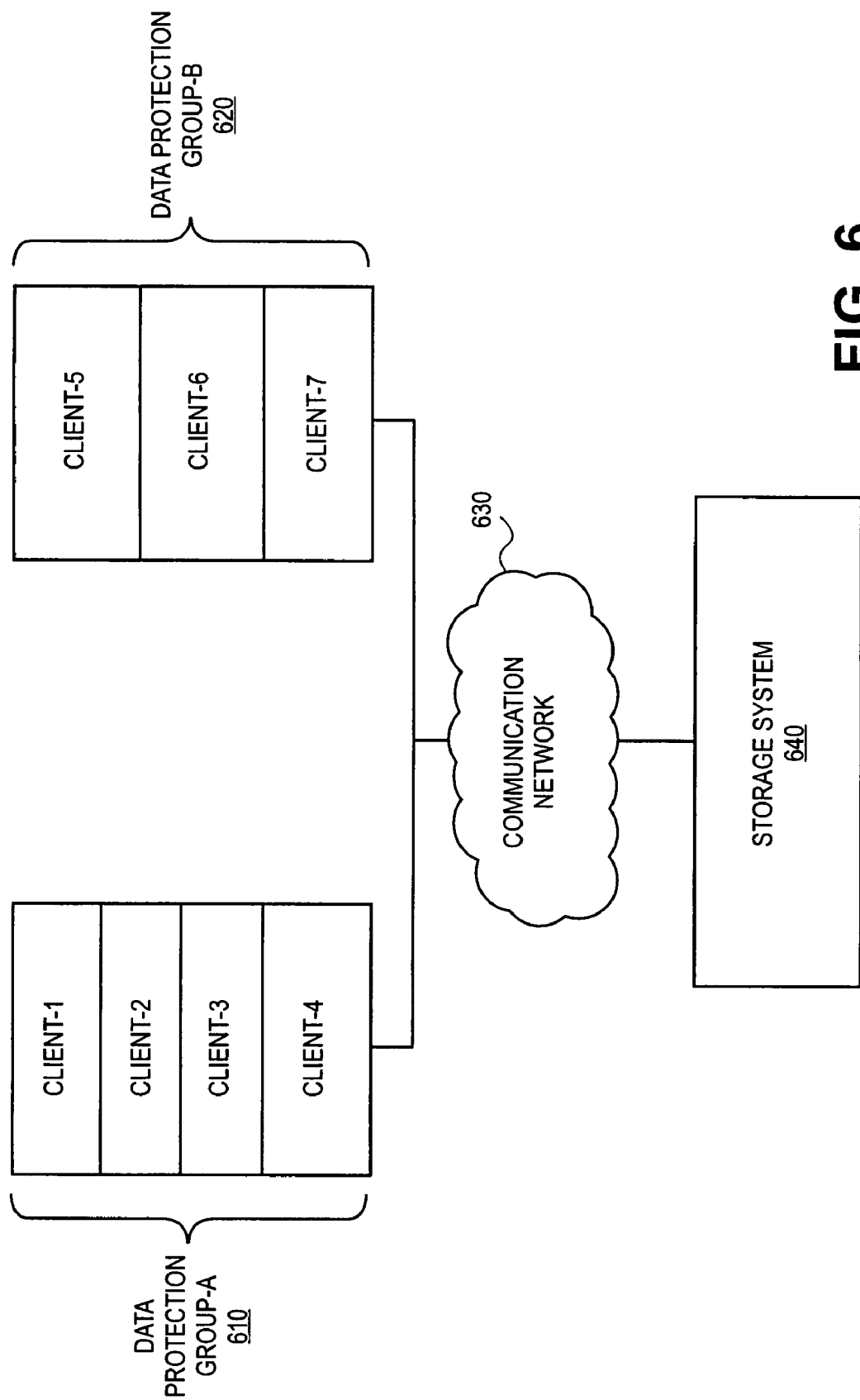
FIG. 6 is a block diagram of an embodiment of the present invention.

FIG. 6 is a block diagram of an embodiment of the present invention. In particular, multiple clients, such as client-1, client-2, client-3, and client-4, can be organized as a data protection group (DPG). For example, as illustrated with respect to FIG. 6, DPG-A 610 includes multiple clients that can be any computing device with storage devices, e.g. a laptop, desktop computer, host/server computer, or the like. Illustratively, DPG-A 610 can make available for incorporation a total amount of 10 GBs of storage. DPG-B 620, also including multiple clients, also makes available the same amount of storage space for incorporation, thus enabling DPG-A 610 and DPG-B 620 to be mirrors of one another. It should be appreciated that more data protection groups can be used in other embodiments of the present invention that utilize other RAID methodologies (e.g. RAID-4, RAID-5, RAID-DP™, etc.), or the like, to enable the protection of data stored on clients.

Returning to the embodiment illustrated by FIG. 6, the storage system 630 can incorporate storage devices from DPG-A 610 and DPG-B 620 to store data via the communication network 630. For example, during a write operation, data is written to both DPG-A 610 and DPG-B 620. When a read operation is performed to access data stored in the data protection group, then the data can be read from either DPG-A 610 or DPG-B 620. Further, in the event that a data protection group is unavailable, e.g. if a laptop (client-1) is shutdown, then data stored in the data protection group can be provided by DPG-B 620. When client-1 becomes available, then DPG-A 610 and DPG-B 620 can synchronize to keep the data current. Such synchronization methods can include, for example, preventing write access to both DPG-A 610 and DPG-B 620 while data is compared and written to the appropriate storage device.

In yet another embodiment of the present invention (not shown), before data is written to an incorporated client storage device, the storage operation system of the storage system can encrypt the data to be written. By encrypting data, e.g. in blocks written to a client storage device during RAID processing, the encrypted blocks of data cannot be deciphered by an unauthorized read operation. Specifically, an authorized read operation may only be performed by the storage system. Thus, all other computing devices performing a read operation directly to the storage device is unauthorized. It should be appreciated that exemplary encryption methods of embodiments of the present invention can include, for example, Advanced Encryption Standard (AES) implemented by the storage operating system. In another embodiment, the encryption method can be implemented by a separate encryption device from the storage system, such as a device offered by Decru, Inc. of Redwood Shores, Calif.

In another embodiment of the present invention (not shown), a client may use a virtual machine application, such as VMware, available from VMware of Palo Alto, Calif., or the like. Specifically, a client implementing such virtual machine applications can present to a storage system for incorporation, separate virtual machines. It should be appreciated that each virtual machine has a mutually exclusive storage device address space. By presenting the storage devices of a client in this mutually exclusive fashion, data can be isolated to a specific address space of a client storage device. By isolating the data, a first virtual machine of a client cannot read the data directly of a second virtual machine of the client. In order to access the data, the first virtual machine of the client initiates a read request to the storage system, which, in turn, can access the data stored on the second virtual machine of the client.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method of operating a storage server coupled with a storage client over a network, the method comprising:
    polling a client storage device of the storage client to determine available storage space of the client storage device, the storage client being a client of the storage server and configured to utilize storage services provided by the storage server;
    incorporating the available storage space of the client storage device into a RAID group managed by the storage server by expanding the RAID group managed by the storage server to include the available storage space of the client storage device; and
    managing the incorporated available storage space of the client storage device as a part of the RAID group managed by the storage server, wherein said managing includes using file system services provided by the storage server to manage the client storage device, and wherein the storage server is capable of satisfying data access requests from incorporated storage space of the client storage device managed by the storage server.

2. The method of claim 1, wherein the storage client initiates a request to access stored data which is located in a second client storage device of a second storage client coupled with the storage server over the network and wherein access to the stored data in the second storage client is transparent to the storage client initiating access.

3. The method of claim 1, wherein the incorporated client storage device is configured to operate as a virtual disk by the storage server.

4. The method of claim 1, further comprising:
removing the incorporated client storage device from the RAID group managed by the storage server, including updating a client storage database to reflect removal of the incorporated client storage device from the RAID group managed by the storage server.

5. The method of claim 4, wherein the client storage database includes a list of clients with storage for use by the storage server.

6. The method of claim 5, wherein the list includes storage device capacity information of a client.

7. The method of claim 1, wherein the redundancy group is a RAID group.

8. The method of claim 1, wherein satisfying data access requests from incorporated storage space of the client storage device managed by the storage server comprises:
receiving at the storage server a request from a client to store or retrieve data; determining in the storage server that the request should be directed to the client storage device; and
in response to determining in the storage server that the request should be directed to the client storage device, forwarding to a storage redundancy subsystem in the storage server, storage location information corresponding to a storage location in the client storage device, wherein in response to receiving the storage location information the storage redundancy subsystem in the storage server causes a data access request to be transmitted from the storage server to the client storage device to store or retrieve the data.

9. The method of claim 8, wherein the storage redundancy subsystem is a RAID subsystem.

10. The method of claim 1, wherein the RAID group is managed exclusively by the storage server.

11. A storage server, comprising:
a storage subsystem managed by the storage server, the storage subsystem including a plurality of storage devices coupled to the storage server;
a network interface of the storage server coupled via a network to a storage client having a client storage device, the storage client being a client of the storage server and configured to utilize storage services provided by the storage server, the client storage device capable of incorporation into the storage subsystem; and
a detection module configured to poll the client storage device of the storage client to identify available storage space of the client storage device,
wherein the storage server is configured to incorporate available storage space of the client storage device into the storage subsystem managed by the storage server by expanding a RAID group of the storage server to include the available storage space of the client storage device and to manage the storage space of the client storage device as a part of the storage subsystem by using file system services provided by the storage server to manage the client storage device, wherein the storage server is configured to satisfy data access requests using incorporated storage space of the client storage device.

12. The storage server of claim 11, further comprising:
a configuration module to receive availability data of the client storage device;
an interface module to communicate with the storage client; and a client storage database providing a list of client storage devices for use by the storage server.

13. The storage server of claim 11, wherein the storage server is further configured to: initiate a data access request; and satisfy the data access request transparently from a client storage device.

14. The storage server of claim 13, wherein satisfying a data access request transparently further includes examining a storage repository managed by the storage server.

15. The storage server of claim 14, wherein examining the storage repository includes examining a list of clients with available storage to satisfy the data access request.

16. The storage system of claim 11, wherein a computing device that has a plurality of client storage devices makes available an address space of at least one of the plurality of client storage devices for incorporation into storage managed by the storage server.

17. The storage server of claim 11, wherein the RAID group is managed exclusively by the storage server.

18. A computer readable storage medium having instructions stored thereon for managing data in a storage server coupled with a storage client over a network, the instructions comprising:
instructions to poll a client storage device of the storage client to determine underutilization of storage space of the client storage device, the storage client being a client of the storage server and configured to utilize storage services provided by the storage server;
instructions to incorporate available storage space of the client storage device into a RAID group managed by the storage server by expanding the RAID group to include the available storage space of the client storage device; and instructions to manage the storage space of the client storage device as a part of the RAID group managed by the storage server, wherein managing the storage space of the client storage device as a part of the RAID group managed by the storage server includes using file system services provided by the storage server to manage the client storage device, and wherein the storage server is capable of satisfying data access requests from incorporated storage space of the client storage device managed by the storage server.

19. The computer readable storage medium of claim 18, further including instructions to configure the incorporated client storage device to operate as a virtual disk by the storage server.

20. The computer readable storage medium of claim 18, further including instructions to update a client storage database to reflect removal of the incorporated client storage device from the RAID group managed by the storage server.

21. The computer readable storage medium of claim 20, further including instructions to list clients having available storage for use by the storage server.

22. The computer readable storage medium of claim 21, further including instructions to list storage device capacity information of a client.

23. The computer readable storage medium of claim 18, wherein the RAID group is managed exclusively by the storage server.

24. A method comprising:
determining, by a storage server, that a client storage device of a storage client has available storage space, the storage client being a client of the storage server and configured to utilize storage services provided by the storage server;
incorporating the available storage space of the client storage device into a RAID group of the storage server; and
managing, by the storage server, the incorporated available storage space of the client storage device as a part of the RAID group of the storage server, including satisfying data access requests from clients by using file system services of the storage server to access the incorporated storage space of the client storage device.

25. The method of claim 24, wherein the RAID group is managed exclusively by the storage server.

* * * * *